US010185626B2

(12) United States Patent
Mowatt

(10) Patent No.: US 10,185,626 B2
(45) Date of Patent: Jan. 22, 2019

(54) AUTOMATIC APPLICATION ERROR DETECTION AND ROLLBACK

(71) Applicant: Microsoft Technology Licensing, LLC, Redmond, WA (US)

(72) Inventor: David Mowatt, Dublin (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 146 days.

(21) Appl. No.: 15/258,221

(22) Filed: Sep. 7, 2016

(65) Prior Publication Data
US 2018/0067811 A1     Mar. 8, 2018

(51) Int. Cl.
*G06F 11/00* (2006.01)
*G06F 11/14* (2006.01)
*G06F 17/30* (2006.01)

(52) U.S. Cl.
CPC ...... *G06F 11/142* (2013.01); *G06F 17/30887* (2013.01); *G06F 2201/805* (2013.01)

(58) Field of Classification Search
CPC .............. G06F 11/142; G06F 11/0709; G06F 11/0793; G06F 11/1402; G06F 11/2433; G06F 11/1469; G06F 11/368; G06F 17/30887; G06F 2201/805
See application file for complete search history.

(56) References Cited

U.S. PATENT DOCUMENTS

| 7,185,071 | B2  | 2/2007  | Berg et al. |
| RE41,162  | E   | 3/2010  | Engel et al. |
| 9,032,383 | B2  | 5/2015  | D'Aurelio et al. |
| 9,081,964 | B2  | 7/2015  | Liu et al. |
| 9,087,156 | B2  | 7/2015  | Patton et al. |
| 9,110,752 | B2  | 8/2015  | Sherman |
| 2007/0180084 | A1* | 8/2007 | Mohanty ............ G06F 11/1451 709/223 |
| 2007/0261049 | A1* | 11/2007 | Bankston ............ G06F 8/65 717/170 |

(Continued)

OTHER PUBLICATIONS

Selvam, et al., "Identify and Rectify the Issues in Mobile Applications in Various Platforms", In International Journal of Advanced Research in Computer and Communication Engineering, vol. 4, Issue 9, Sep. 2015, pp. 59-61.

(Continued)

*Primary Examiner* — Joseph D Manoskey
(74) *Attorney, Agent, or Firm* — Talem IP Law, LLP

(57) ABSTRACT

An automatic application error detection and rollback service can manage access to at least two versions of an application based on error reports. The versions of the application can include a previous version and a new version that can be an updated version of the previous version. Access to the previous version of the application may include a previous version URL and access to the new version of the application may include a new version URL. The rollback service may provide the new version URL to a plurality of clients. The rollback service may then receive error information of the new version for at least one individual client of a plurality of clients running the new version. Based on the error information, the rollback service may automatically change the new version URL to the previous version URL for the at least one individual client.

20 Claims, 4 Drawing Sheets

(56) References Cited

U.S. PATENT DOCUMENTS

| | | | |
|---|---|---|---|
| 2008/0178169 A1* | 7/2008 | Grossner | H04L 67/16 |
| | | | 717/170 |
| 2013/0179865 A1 | 7/2013 | Neumeyer et al. | |
| 2014/0007075 A1* | 1/2014 | Sporkert | G06F 8/68 |
| | | | 717/173 |
| 2014/0047115 A1 | 2/2014 | Lipscomb et al. | |
| 2015/0058679 A1 | 2/2015 | Jackson et al. | |
| 2015/0143354 A1 | 5/2015 | Mathew et al. | |
| 2015/0186128 A1 | 7/2015 | Patton et al. | |

OTHER PUBLICATIONS

Ravindranath, et al., "Automatic and Scalable Fault Detection for Mobile Applications", In Proceedings of the 12th annual international conference on Mobile systems, applications, and services, Jun. 16, 2014, 14 pages.

* cited by examiner

AUTOMATIC APPLICATION ERROR DETECTION AND ROLLBACK

BACKGROUND

Consumers, individuals, and enterprise utilize a variety of applications in their daily life, including Microsoft® Office from Microsoft Corp. and SAP® software from SAP SE. In the enterprise environment, applications may need to evolve as the enterprise evolves its information technology (IT) infrastructure, invests in new areas, or improves employee productivity. In the general consumer environment, marketplace development also contributes. Therefore, an IT department, or individual developers will be obliged at a certain point to make updates to the applications that employees or consumers use; and as with any application upgrade, change also brings a non-zero chance that a process capability will be inadvertently broken.

Historically, in the enterprise environment, when applications are deployed to users the deployment is accomplished by physically installing the application package (which may be tens of megabytes or more) onto a disk image, and then this disk image is copied to a user's personal computer (PC). Significant investment is required to re-image all employee's machines with a new version and it is even more costly if this must be repeated to fix a bug in that new version. For the general consumer, installing and uninstalling applications can also be a challenge.

BRIEF SUMMARY

Techniques and services are disclosed for automatic application error detection and rollback.

An automatic application error detection and rollback service can manage access to at least two versions of an application based on error reports. The at least two versions can include a previous version and a new version (which may be an update to the previous version). While the previous version is a current version, clients access the previous version via a previous version uniform resource locator (URL) provided to the clients by the automatic application error detection and rollback service. The automatic application error detection and rollback service may provide a new version URL to a plurality of clients, for example, based on a developer update, so that the clients can access the new version of the application. After the update, the automatic application error detection and rollback service continues to maintain access to the previous version.

According to certain embodiments, the automatic error detection and rollback service receives error information of the new version for at least one individual client of a plurality of clients using the new version. Based on the error information, the automatic error detection and rollback service may then change the new version URL to the previous version URL for the at least one individual client. The new version URL may be changed to the previous version URL by changing an entry for an account of the one individual client from the new version URL to the previous version URL or by providing a new extensible markup language (XML) representation to the at least one individual client, wherein the new XML, representation includes the previous version URL. The client may receive the rollback as a "push" type notification or modification or the client may receive the rollback as a "pull" type change, for example, in response the client requesting to access or run at least a new feature of the application specified by the new version URL.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
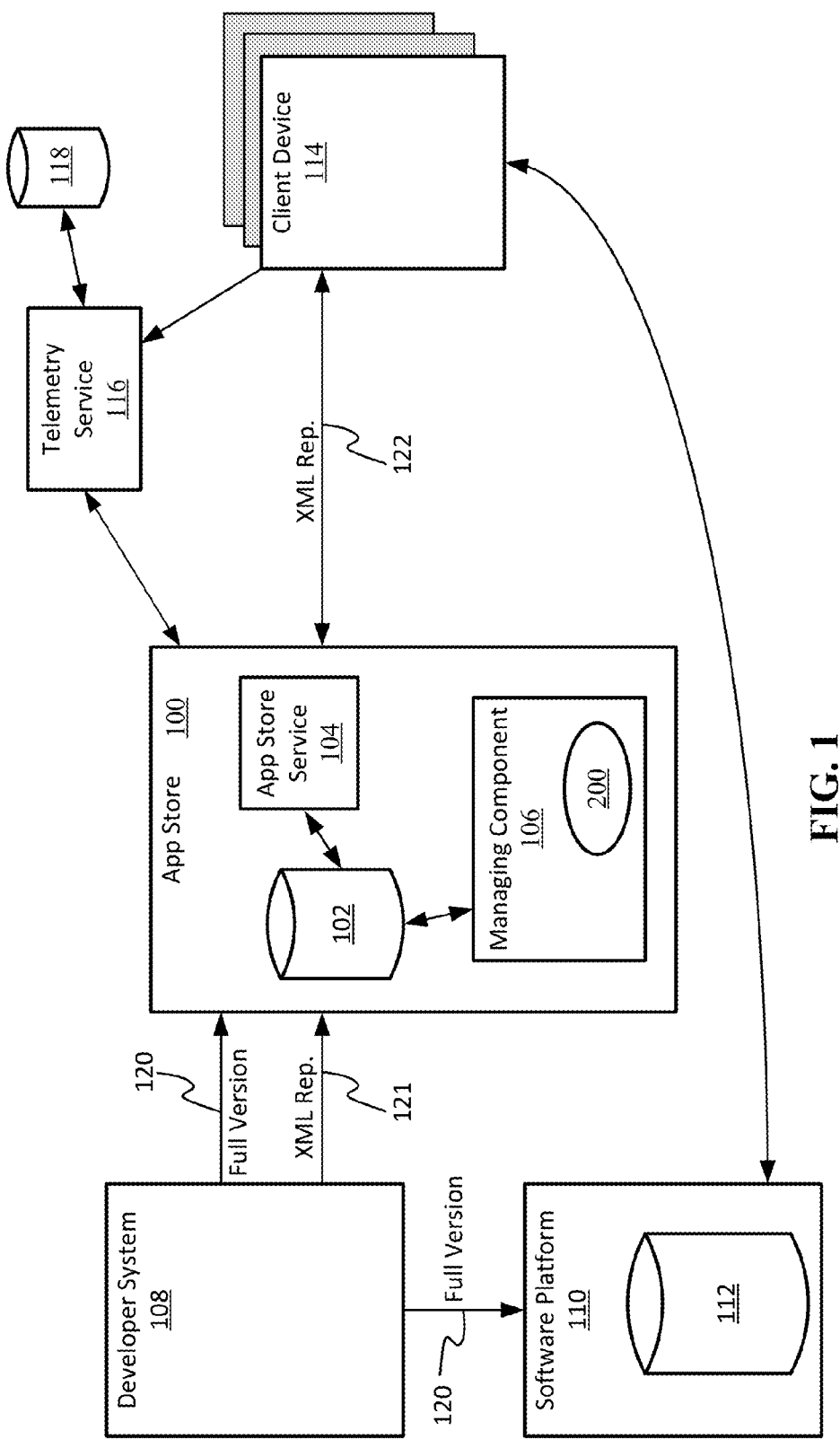
FIG. 1 illustrates an example operating environment in which automatic application error detection and rollback may be carried out.

Techniques and services are disclosed for automatic application error detection and rollback. An automatic application error detection and rollback service ("rollback service") is provided that can manage access to at least two versions of an application based on error reports.

Although reference is made to an "application", it should be understood that the application can have varying scope of functionality. That is, the application can be a stand-alone application or an add-in or feature of a stand-alone application.

The rollback service can be part of an application distribution platform. Application distribution platforms can implement an online store for purchasing and downloading software applications and/or components and add-ins for software applications. Examples of application distribution platforms include, but are not limited to, Google Play™ store from Google, Inc., App Store® from Apple, Inc., and Windows® Store from Microsoft Corp. An application distribution platform may be referred to as an "app store" or an "application marketplace".

An app store incorporating the rollback service may allow a developer to submit an application to the app store through a submission portal. The developer may provide metadata (e.g., title and description) and upload the application. The app store may be a known application distribution platform (such as Google Play, Apple App Store, or Windows Store) or an internal/enterprise distribution platform. In a case that the app may is an internally developed app (that is specific to a particular enterprise), the app may be uploaded via an administrative portal for the purposes of deploying to users of the enterprise. The same metadata as provided to the known app stores may be provided for the internal app store.

In some app stores, the developer may provide the full version of the application, which may contain all logic, graphics, and functionality. In other app stores, a simple XML representation of the application may be uploaded which contains a declarative description of what capabilities the application has, what features/services the application accesses and a URL pointing to the cloud-based services that contain the functionality. To perform automatic rollback services, the rollback service requires at least two versions of an application (in the form of a full version, a representation, or combination thereof). An example of a representation is an application such as a Microsoft Office add-in or a Google sheets add-on, where the majority of the logic/processing/resources is kept on a separate server, and the only portion of the application which is installed is an XML representation that contains the application's properties and a URL pointer to that server A validation team may be present to ensure that the functionality of the one or more features/services (previous features and new features) of the application seem to be working as expected. In some cases, the validation team may perform only basic checking. In other cases, the app store may not perform any verification. An internal validation service may also exist for internal/enterprise app stores.

For applications using the automatic rollback services, at least two versions are present on the app store site for the same application (e.g., one new version, one previous version). While there may be two versions present with the service, the app store is not required to present both for selection; rather, a user may only see one version for sale on the app store interface. For example, a user accessing an app store and purchasing an application may simply see one version—the current version. When the user updates the application, the user can update to the latest version of the application. However, since the rollback service manages the versions of the application, even though the user has the new version, if there are problems with the new version (determined from collected error information) the application will automatically roll back to an earlier version through the use of a previous version URL.

According to certain embodiments, the rollback service may receive error information of the new version for at least one individual client of the plurality of clients using the new version. The rollback service may receive the error information from a telemetry service or directly from the at least one individual client. The error information may comprise one or more of an error signal, changes in usage data, performance data, and other telemetry information.

Based on the error information, the rollback service may then change the new version URL to the previous version URL for the at least one individual client. The new version URL may be changed to the previous version URL by changing an entry for an account of the one individual client from the new version URL to the previous version URL or by providing a new XML, representation to the at least one individual client, wherein the new XML representation includes the previous version URL. The client may receive the rollback as a "push" type notification or modification or the client may receive the rollback as a "pull" type change, for example, in response the client requesting to access or run at least a new feature of the application specified by the new version URL. Another example of a "pull" type scenario is in a case where a client (e.g., the client application or the operating system of the client device) calls back to the rollback service (on a periodic or other basis) to see if a newer version is available.

In some cases, failure telemetry can further be provided back to the developer so that the developer may address the issue.

Figure 2:
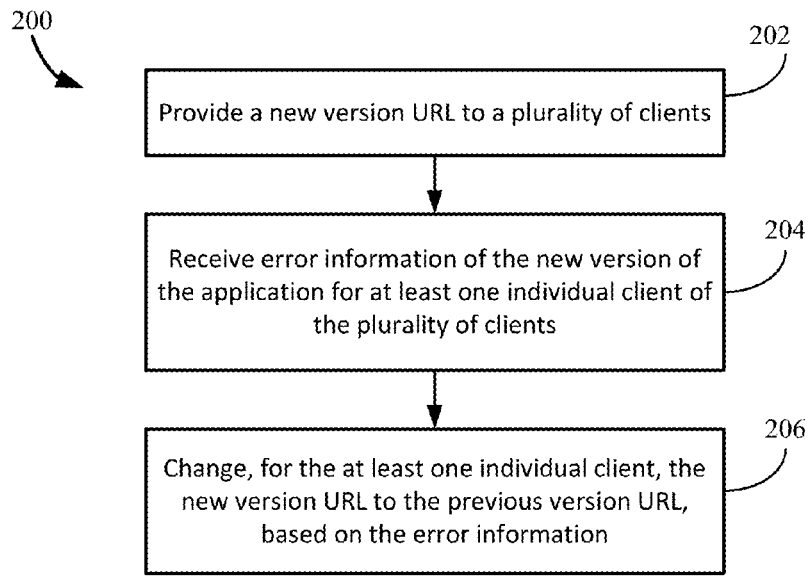
FIG. 2 illustrates an example process for automatic application error detection and rollback.

FIG. 1 illustrates an example operating environment in which automatic application error detection and rollback may be carried out and FIG. 2 illustrates an example process for automatic application error detection and rollback. Referring to FIG. 1, an example operating environment can include an app store system 100, which can include an app store data resource 102, app store service 104, and a managing component 106 that may perform process 200 described with respect to FIG. 2; a developer system 108 from which a software developer may carry out a variety of tasks related to their software application; a software platform 110 that can host software applications (e.g. for web-based applications) and which can include a software platform data resource 112 that can store the software applications; one or more client devices 114 (which may each be embodied as described with respect to system 600 of FIG. 6); a telemetry service 116 and telemetry data resource 118. Although managing component 106 is shown as part of the app store system 100, certain embodiments are not limited thereto. For example, aspects of the managing component 106 (and therefore steps of process 200) may be executed at a client device 114 or even the software platform 110. In yet other embodiments, such as in an enterprise environment, the managing component 106 (and a corresponding resource storing information about applications) can be part of an enterprise server that is used to deploy software to clients within the firewall of the enterprise.

Figure 6:
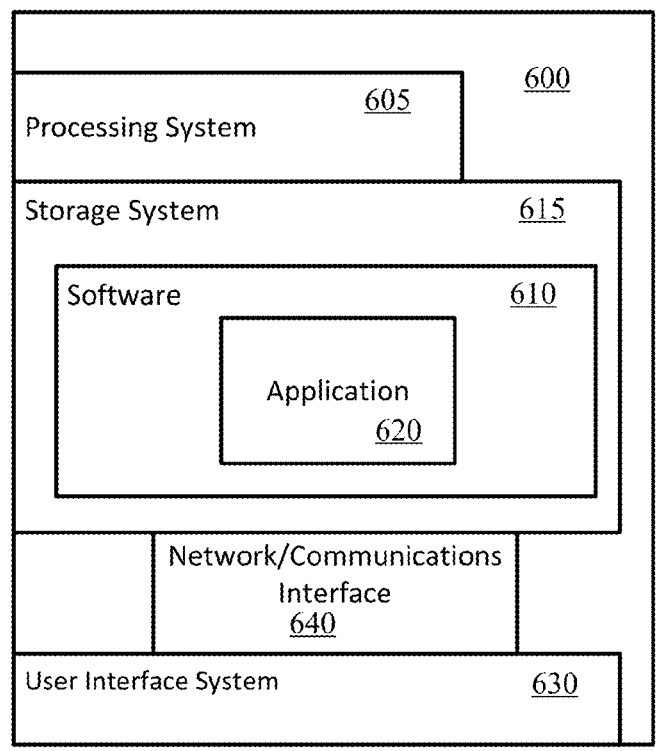
FIG. 6 illustrates components of an example computing system.
Figure 7:
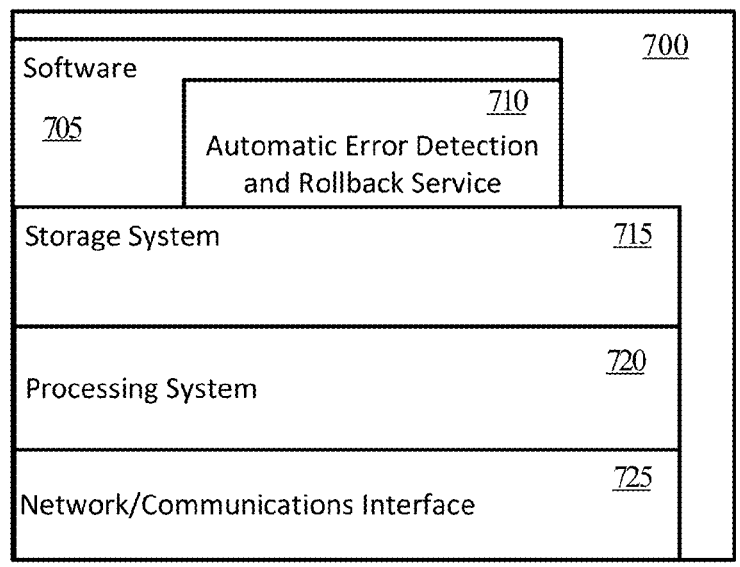
FIG. 7 illustrates components of an example server computing system.

App store system 100, developer system 108, and software platform 110 may each independently or in combination be embodied such as described with respect to system 600 of FIG. 6 or system 700 of FIG. 7. Telemetry service 116 and telemetry data resource 118 may be incorporated as part of an independent telemetry system (not shown) embodied as system 600 or 700, or may be incorporated as part of any of app store system 100, developer system 108, software platform 110, or even client device 114. In some scenarios software platform 110 and app store system 100 may be managed by a same entity. In some scenarios, software platform 110 and developer system 108 may be managed by a same entity. In yet other scenarios, the app store system 100, developer system 108, software platform 110 may be managed by a same entity. Similarly, telemetry service 116 may be managed by a same entity as software platform 110, developer system 108, and/or app store system 100.

A developer user, using developer system 108, may use the app store service 104 to distribute an application. The developer may provide the app store service 104 a full version 120 of the application (plus some additional metadata) or a representation 121 of the application (plus metadata). The full version 120 of the application may contain all logic, graphics, and functionality of the application (e.g., a calculator file in a APPX format for the Windows® Store from Microsoft Corp.). The representation 121 of the application refers to a format providing a reference to and information about the application. The representation 121 of the application may contain information such as a declarative description of what capabilities the application has, what features or services the application has, and a URL pointing to a location providing the functionality (e.g., a cloud-based service or web-based application). The representation 121 of the application may be in the form of an XML representation.

In a case that the full version 120 of the application is not provided to the app store service 104, the actual location providing the functionality for the application (and which is identified by the URL that is provided with the representation 121 to the app store service 104) can be at the developer system 108 or at a location supported by software platform 110 (in some cases, the application may even be located at a user's device). For example, the full version 120 may be provided to software platform 110, which stores the full version 120 of the application in the software platform data resource 112.

To facilitate automatic application error detection and rollback, at least two versions (in full or in representation) will be present on the app store system 100 for the same application. Of course, both versions do not have to be provided by the developer at the same time. For example, the second version may be provided at a time that a developer is ready to release an updated version. Of course, three, four, or more versions can be managed. For example, the four most recent versions may be stored at the app store system 100 in order to ensure that the application runs properly on every user's device as certain updates may be suitable for a subset of devices/clients.

The managing component 106 manages access to the at least two versions of the application. The managing component 106 can manage access to the at least two versions by, for example, storing at least the previous version URL and the new version URL at the app store data resource 102 (which may be an instantiation of storage system 715); and storing account information for the plurality of clients 114. The account information can include information on which applications that a particular user and/or particular user device have purchased or otherwise received.

The app store system 100 can store the full version 120 or the representation 121 that is received from the developer system 108 in the app store data resource 102 (or other storage resource associated with system 100). When the full version 120 is stored by the app store system 100, a URL can be generated for accessing the full version 120. In some cases, the managing component 106 may separately store the URL provided by the representation 121 or generated from the storing of the full version 102 in a database or other data structure (in the app store data resource 102, which may be the same resource or a different resource as that storing the full version 120 and/or representation 121) as part of the managing of the access to the versions.

When end users of the application use the application on a particular device (e.g., at client device(s) 114), the client devices 114 may call back to the app store service 104 to see if a newer version is available. The app store system 100 (via managing component 106) can, as part of process 200 illustrated in FIG. 2, provide (202) the new version URL to a plurality of clients (e.g., client devices 114).

In one implementation, the app store system 100 may provide the new version URL to the client 114 by sending a representation 122 of the application to the client 114 that includes the new version URL. The representation 122 may be an XML representation. In some cases, it may be the same XML representation as received from the developer. In some cases, the app store 100 may add extra metadata to the XML representation before passing it on to the client 114.

In some cases, the new version URL may be provided due to an update from the previous version of the application to the new version of the application. The app store system 100 may include logic to determine a more gradual switch from clients from the current version to the newer version. The logic may further be refined by the developer at submission time. For example, the rollback service may only inform ten percent of consumers that a new version is available, or may only inform consumers using a particular version of the platform. For example, the rollback service may only inform users in France, but not other locales. In some cases, the rollback service may only inform users of a particular browser or operating system, or users who have a second specific or related application (e.g., with a specific version number).

After the new version URL has been provided (202), telemetry can be carried out to identify errors that may occur from use of the new version. The managing component 106 can receive (204) error information of the new version for at least one individual client of the plurality of clients. The app store system 100 includes or communicates with telemetry service 116 to receive the error information.

The error information may be gathered from a variety of clients via client devices 114 and/or software platform 110, and stored in a telemetry data resource 118. According to certain embodiments, the error information stored in telemetry data resource 118 may be from numerous versions of the application. For example, the managing component 106 may manage five different versions of the application and numerous clients may each be running a different version. Therefore, when the managing component 106 receives error information from each client, it may be receiving error information from all five different versions. The telemetry service 116 can provide the managing component 106 with information such as application identifier and version number (e.g., previous, new, other version).

According to various embodiments, error information may include, but is not limited to, error signals, error logs, error information from debuggers, usage data (changes therein/thereto), performance data, and other telemetry information. The error information may be communicated through a telemetry message. A "telemetry message" is a signal from a client containing one or more kinds of telemetry data. The telemetry message may also contain an indicator of the source of the telemetry, identifying, for example, the device, user, application, version, internet browser, installation/usage of other relevant applications, component, license code, subdivision or category within an application or component, or other information that is the origin of the telemetry message. In some cases, the broken application is a class of connector, connecting to a separate service (for example, an Outlook add-in connecting to a Microsoft Dynamics service to retrieve data). In some of such cases, version and other configuration information about that service may be sent back to the rollback service. In some cases, the telemetry message may not include the indicator identifying the user where the error originated. In these cases, the rollback service may roll back everyone using the new version of the application.

Another example of error information may include a "call home" signal sent while a user is using the application. The signal may be sent after one second, five seconds, and 15 seconds. Further, a "started" or "ended" signal may also be sent when the application is started or closed. These signals may inform the service the amount of time that a user spends in the application. If the previous version use to be used for "15 seconds" (on average), but the new version is used for only "3 seconds", or if the previous version was used 8 times a day but the new version is used a few times and then not again, then the service may be able to draw the conclusion that the new version may be problematic.

In certain embodiments, the error information may be communicated to the developer system 108 in order empower the developer to fix the problem. For example, it may be the case that the application only fails on certain versions of the platform, e.g., an application does not work a smart phone, but does work on laptop. Another example may be that the application works on one operating system, but does not work on another operating system. In some implementations, a portal may be provided to the developer so that the developer can review error logs or other telemetry information that was collected and/or informed the service to roll back the application version. A developer, via developer system 108, may access the portal (which may be executed on a computing system associated with the app store or separate telemetry service) in order to access the usage/failure information for their application.

Based on the error information, the managing component 106 can change (206), for the at least one individual client, the new version URL to the previous version URL. The telemetry service 116 or the rollback service may analyze the error information for the at least one individual client to determine whether criteria for reverting back to an earlier version is satisfied. Some examples of how the managing component 106 may change the new version URL to the previous version URL are described in greater detail with respect to FIGS. 3A and 3B.

The timing for performing operation 206 may depend on implementation. In some cases, changing the new version URL to the previous version URL can be in response to receiving a request from a client as to whether a new version of the application is available (e.g., in a "pull" manner). The client may make such requests periodically, manually, or at designated times. In response to receiving such a request, the managing component 106 may check the error information for the client and, based on that error information change the version to the previous version, thereby preventing users from using the new version. In some cases, changing the new version URL to the previous version URL can be performed automatically when the service receives the error information (e.g., in a "push" manner).

In some cases, the change may be performed in response to receiving a request to access or run the application specified by the new version URL. For example, at a time that a user tries to use the application, the change can be made so the appropriate version is executed. In some cases, the change may be made for all users of the new version when a critical threshold is reached. For example, the developer can set a critical threshold for how many errors are received and once that critical threshold is reached, every new version user is rolled back to the previous version. In certain embodiments, a notification may be shown to the user when the service rolls back the application to the previous version.

The described systems and techniques detect when at least one user (or a specified number of users) is having a problem with the new version and can automatically perform a rollback to the previous version for the at least one user. The automatic rollback may allow the user, whether a consumer or at an enterprise, the ability to continue working on the application without a significant delay and loss of work product.

In some cases, the rollback may be done initially for a small subset of the affected population so that their usage (on the prior version) may also be recorded. In one such implementation, if the failure rate for this small subset of the affected population is much decreased, the roll-back to the previous version may then be enacted for all users. If the failure rate for the previous version was comparable to the current version, then other actions may be taken (e.g. the developer (and/or administrators) is alerted through a high priority channel, or the application is withdrawn from the app store for new users, or a notification appears in the user's clients).

Figure 3A:
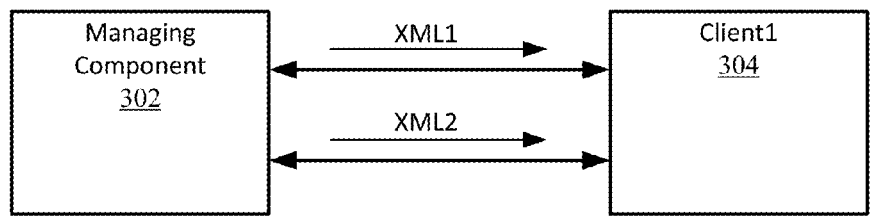
FIGS. 3A and 3B illustrate some examples of access management that may be carried out by managing component.
Figure 3B:
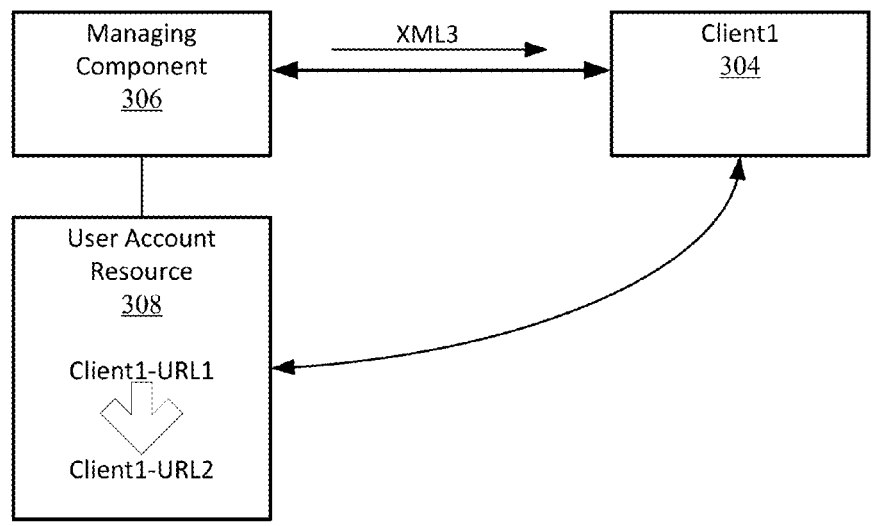

FIGS. 3A and 3B illustrate some examples of access management that may be carried out by managing component. As mentioned in FIGS. 1 and 2, based on error information, the rollback service (through, for example, managing component 106) may change the new version URL to the previous version URL for at least one individual client. In one case, such as illustrated in FIG. 3A, the new version URL may be changed to the previous version URL by having the rollback service provide a new XML representation to the at least one individual client, wherein the new XML, representation includes the previous version URL. In another case, such as illustrated in FIG. 3B, the new version URL may be changed to the previous version URL by having the rollback service change an entry for an account of the one individual client from the new version URL to the previous version URL.

Referring to FIG. 3A, managing component 302 (which can be an instantiation of managing component 106) can provide the new version URL to a client (and thus access to the new version of the application) by sending an XML representation of the application, such as XML1, to client1 304. XML1 is an XML, representation that contains the new version URL. Access to the new version of the application is possible via the new version URL. The managing component 302 may receive error information of the new version of the application for client1 304 in any of the manners described in FIGS. 1 and 2. Based on the received error information, the managing component 302 may then change the user's access from the new version URL to the previous version URL.

In this example, to change the URL, managing component 302 provides the previous version URL to client1 304 by sending an XML representation of the application, such as XML2, to the client1 304. As described previously, the change may occur automatically or may be in response to receiving a request or call from client1 304. XML2 is an XML representation that contains the previous version URL. Client1 304 now accesses the previous version of the application via the previous version URL. The client1 304 may at a future date receive access to a newer version of the application, for example at a time the client1 304 requests to run or access the application (and a newer version is available) or at a time the client1 304 requests to update the application.

Referring to FIG. 3B, managing component 306 (which can be an instantiation of managing component 106) can provide access to the new version of the application to a client by sending an XML representation of the application, such as XML3, to client1 304. The XML3 representation received by client1 304 can include a URL that specifies the location of a user account resource 308, which can be a structured data resource, instead of the location of the full version of the application. The managing component 306 can change an entry for an account of the user (via client1 304) from the new version URL to the previous version URL based on the error information. For example, the managing component 306 may change a pointer in the structured data resource to the correct version URL. When client1 304 executes the client application, the URL (provided by XML3) will access the user account resource 308 and the managing component 306 can direct the client1 304 to the appropriate version.

For example, when the managing component provides the XML representation of the application, such as XML3, to client1 304, the pointer in the user account resource 308 may be pointing to client1-URL1. URL1 can be the new version URL and specify the location of the new version of the application. Therefore, when the pointer points to client1-URL1, the user can have access to the new version of the application. Based on error information, the managing component 306 may then change the new version URL to the previous version URL. For example, the managing component 306 may change the pointer from client1-URL1 to client1-URL2. URL2 can be the previous version URL and specify the location of the previous version of the application. Therefore, when the pointer points to client1-URL2, the user will access the previous version of the application instead of the new version of the application.

As described previously, the client1 304 may at a future date receive access to a newer version of the application, for example when the developer of the application submits an even newer version of the application to the app store which triggers the rollback service to roll forward to the latest update, at a time the client1 304 requests to run or access the application (and a newer version is available), or at a time the client1 304 requests to update the application.

Figure 4:
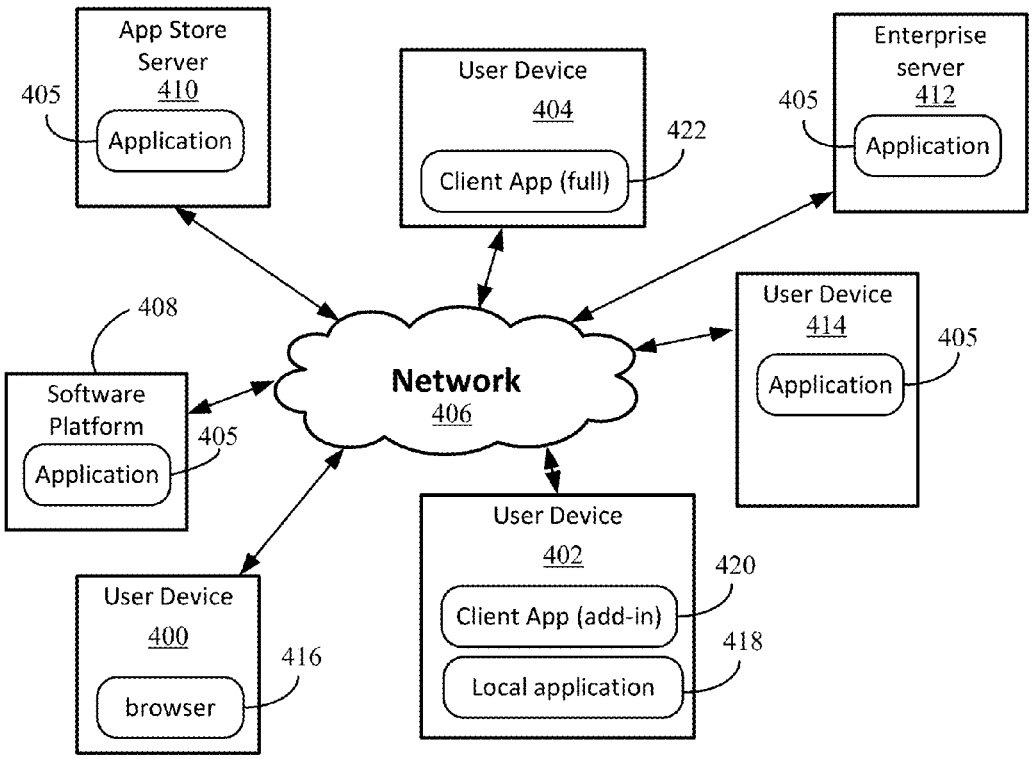
FIG. 4 illustrates various scenarios in which applications subject to automatic application error detection and rollback services can be executed.

FIG. 4 illustrates various scenarios in which applications subject to automatic application error detection and rollback services can be executed. Referring to FIG. 4, a user device, such as user device 400, user device 402, and user device 404 may be used to access an application subject to the rollback services 405 over a network 406. Application 405 may be stored at a software platform 408, an app store server 410, an enterprise server 412, or at another user device 414. These configurations can be considered client-server relationships. Communication between computing devices in a client-server relationship may be initiated by a client sending a request to the server asking for access to a particular resource or for particular work to be performed. The server may subsequently perform the actions requested and send a response back to the client.

Communication to and from user device and server may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

In one example, user device 400 includes a browser application 416 that is used to access application 405. In this example, the browser may call the appropriate version URL to the application 405 based on information provided to the browser or the browser may call a URL to a web-based application service, which then calls the appropriate version URL to the application 405.

In another example, user device 402 has a local application 418 to which a user can add the one or more features or services of the application 405. In this example, the client app (add-in) 420 calls the appropriate URL to access the application 405 while the user is running the local application 418. In yet another example, user device 404 has a stand-alone client app 422, which calls the appropriate URL to access the application 405.

The user device(s) 400, 402, 404, and 414, software platform 408, app store server 410, and enterprise server 412 can be embodied as computing systems configured with one or more central processing units (CPUs), memory, mass storage, and I/O devices (e.g., network interface, user input device). Elements of the computing system can communicate with each other via a bus. The hardware platform of computing systems can be embodied in many forms including, but not limited to, a personal computer, a server computer, a hand-held or laptop device, a wearable device a multiprocessor system, a microprocessor-based system, programmable consumer electronics, and a distributed computing environment that includes any of the above systems or devices. Components of the computing systems can be embodied such as described with respect to systems 600 and 700.

The network 406 may be, but is not limited to, a cellular (e.g., wireless phone) network, the Internet, a local area network (LAN), a wide area network (WAN), a WiFi network, or a combination thereof. Such networks may involve connections of network elements, such as hubs, bridges, routers, switches, servers, and gateways. For example, the network 406 may include one or more connected networks (e.g., a multi-network environment) including public networks, such as the Internet, and/or private networks such as a secure enterprise private network. Access to the network 406 may be provided via one or more wired or wireless access networks (not shown), as will be understood by those skilled in the art. As will also be appreciated by those skilled in the art, communication networks can take several different forms and can use several different communication protocols.

Figure 5:
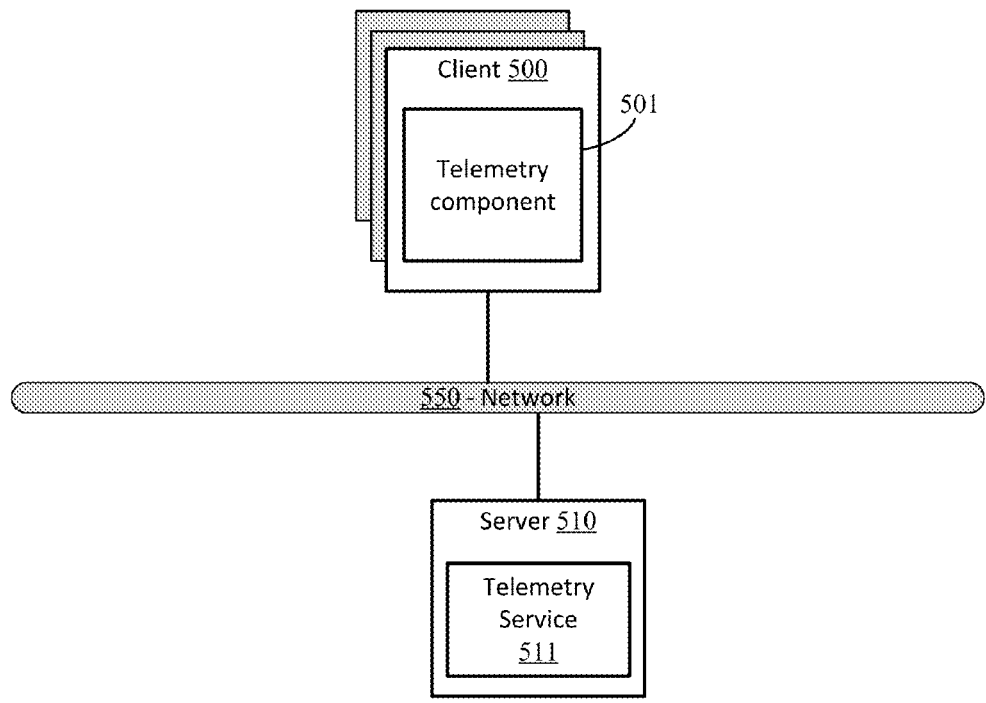
FIG. 5 illustrates an example system architecture for a telemetry service that may be used for automatic application error detection and rollback.

FIG. 5 illustrates an example system architecture for a telemetry service that may be used for automatic application error detection and rollback. In the example illustrated in FIG. 5, a telemetry component 501 for assembling and sending telemetry messages can be implemented on a client device 500, which may be or include computing systems or devices such as a laptop, desktop, tablet, reader, mobile phone, wearable device, and the like. Client device 500 may be embodied such as described with respect to system 600 and can implement the functionality described with respect to device 114 of FIG. 1. Multiple client devices (and clients) may be present in any operative environment, as indicated in FIG. 5 by the shadowed boxes behind client device 500.

Telemetry service 511 may be implemented as software or hardware (or a combination thereof) on server 510, which may be embodied as described with respect to system 700 and ca implement the functionality described with respect to telemetry service 116 of FIG. 1. Telemetry messages from client 500 may be directed to telemetry service 511 via an API, or via another messaging protocol. The telemetry messages may include, but are not limited to, the error information previously described.

Communications and interchanges of data between components in the environment may take place over network 550. The network 550 can include, but is not limited to, a cellular network (e.g., wireless phone), a point-to-point dial up connection, a satellite network, the Internet, a local area network (LAN), a wide area network (WAN), a Wi-Fi network, an ad hoc network, an intranet, an extranet, or a combination thereof. The network may include one or more connected networks (e.g., a multi-network environment) including public networks, such as the Internet, and/or private networks such as a secure enterprise private network.

FIG. 6 illustrates components of an example computing system. Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units, application specific processors, and logic devices, as well as any other type of processing device, combinations, or variations thereof. The processing system 605 may be, or is included in, a system-on-chip (SoC) along with one or more other components such as network connectivity components, sensors, video display components.

The software 610 can include an operating system (OS) and application programs such as application 620 that may include components for communicating with rollback service (e.g. running on server such as system 100 or system 700). Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device OS. Virtualized OS layers, while not depicted in FIG. 6, can be thought of as additional, nested groupings within the operating system space, each containing an OS, application programs, and APIs.

Storage system 615 may comprise any computer readable storage media readable by the processing system 605 and capable of storing software 610 including application 620.

Storage system 615 may include volatile and nonvolatile, removable and non-removable media implemented in any method or technology for storage of information, such as computer readable instructions, data structures, program modules, or other data. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein.

The system can further include user interface system 630, which may include input/output (I/O) devices and components that enable communication between a user and the system 600. User interface system 630 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 630 may also include output devices such as display screen(s), speakers, haptic devices for tactile feedback, and other types of output devices. In certain cases, the input and output devices may be combined in a single device, such as a touchscreen display which both depicts images and receives touch gesture input from the user. Visual output may be depicted on the display in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface.

Communications interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

FIG. 7 illustrates components of an example server computing system. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 720, which may include one or more processors and/or other circuitry that retrieves and executes software 705 from storage system 715. Processing system 720 may be implemented within a single processing device but may also be distributed across multiple processing devices or sub-systems that cooperate in executing program instructions.

Examples of processing system 720 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system(s) 715 can include any computer readable storage media readable by processing system 720 and capable of storing software 705. Storage system 715 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium of storage system 715 a propagated signal or carrier wave.

In addition to storage media, in some implementations, storage system 715 may also include communication media over which software may be communicated internally or externally. Storage system 715 may be implemented as a single storage device but may also be implemented across multiple storage devices or sub-systems co-located or distributed relative to each other. Storage system 715 may include additional elements, such as a controller, capable of communicating with processing system 720.

Software 705 may be implemented in program instructions and among other functions may, when executed by system 700 in general or processing system 720 in particular, direct the system 700 or processing system 720 to operate as described herein for generating and supporting automatic application error detection and rollback (e.g., with service 710).

Software 705 may also include additional processes, programs, or components, such as operating system software or other application software. It should be noted that the operating system may be implemented both natively on the computing device and on software virtualization layers running atop the native device OS. Virtualized OS layers, while not depicted in FIG. 7, can be thought of as additional, nested groupings within the operating system space, each containing an OS, application programs, and APIs.

Software 705 may also include firmware or some other form of machine-readable processing instructions executable by processing system 720.

System 700 may represent any computing system on which software 705, including the rollback service 710 (and managing component 106) and/or application (e.g., full version 120 and application 405), may be staged and from where software 705 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 725 may be included, providing communication connections and devices that allow for communication between system 700 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface can be controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), SoC systems, complex programmable logic devices (CPLDs) and other programmable logic devices now known or later developed. When the hardware modules are activated, the hardware modules perform the functionality, methods and processes included within the hardware modules.

Certain aspects of the invention provide the following non-limiting examples.

In an example, techniques are provided for a computer-implemented method comprising: managing access to at least two versions of an application, the at least two versions comprising a previous version and a new version, wherein access to the previous version includes a previous version uniform resource locator (URL) and access to the new version includes a new version URL; providing the new version URL to a plurality of clients; receiving error information of the new version of the application for at least one individual client of the plurality of clients; and changing, for the at least one individual client, the new version URL to the previous version URL, based on the error information.

In an example further to the above example, changing the new version URL to the previous version URL comprises providing an updated extensible markup language (XML) representation to the at least one individual client, wherein the updated XML representation includes the previous version URL.

In an example further to any of the above examples, changing the new version URL to the previous version URL comprises changing, in a structured data resource, an entry for an account of the one individual client from the new version URL to the previous version URL.

In an example, further to any of the above examples, the changing the new version URL to the previous version URL is performed in response to receiving a request to access or run the application specified by the new version URL.

In an example further to any of the above examples, the method can further comprise receiving a full version of the new version of the application, the full version including logic, graphics, and functionality of the application; storing the full version of the new version of the application; and generating the new version URL.

In an example further to any of the above examples, the method can further comprise receiving an extensible markup language (XML) representation of the new version of the application, the XML representation comprising the new version URL.

In an example further to any of the above examples, the error information comprises one or more of an error signal, error logs, error information from debuggers, changes in usage data, and performance data.

In an example further to any of the above examples, receiving error information of the new version comprises: receiving the error information from the at least one individual client; and analyzing the error information.

In an example further to any of the above examples, the method can further comprise sharing the error information with the developer of the application. The error information may be accessed via a portal.

In an example further to any of the above examples, the receiving of error information of the new version comprises receiving the error information from a telemetry service.

In an example one or more computer readable storage media are provided having instructions stored thereon that, when executed by a computing system, direct the computing system to: provide a new version uniform resource locator (URL) to a client, the new version URL providing access to a new version of an application; receive error information of the new version of the application for at least one individual client of a plurality of clients accessing the new version of the application via the new version URL; and change, for the at least one individual client, the new version URL to the previous version URL, based on the error information.

In an example further to the above example the instructions that direct the computing system to change the new version URL to the previous version URL direct the computing system to: provide an updated extensible markup language (XML) representation to the at least one individual client, wherein the updated XML representation includes the previous version URL.

In an example further to any of the above examples, the instructions that direct the computing system to change the new version URL to the previous version URL direct the computing system to: change, in a structured data resource, an entry for an account of the one individual client from the new version URL to the previous version URL.

In an example further to any of the above examples, the instructions that direct the computing system to change the new version URL to the previous version URL direct the computing system to: change the new version URL to the previous version URL in response to receiving a request to access or run the application specified by the new version URL.

In an example further to any of the above examples, the media can further comprise instructions stored thereon that, when executed by the computing system, direct the computing system to further: in response to receiving a full version of the new version of the application, store the full version of the new version of the application and generate the new version URL; and in response to receiving an extensible markup language (XML) representation of the new version of the application, store the XML representation, wherein the XML representation comprises the new version URL.

In an example further to any of the above examples, the media can further comprise instructions stored there that, when executed by the computing system, direct the computing system to provide a telemetry service that at least receives the error information from the at least one individual client; and analyzes the error information.

In an example, systems are provided that can include a processing system; a storage system; and an automatic application error detection and rollback service stored on the storage system that, when executed by the processing system, directs the processing system to: manage access to at least two versions of an application, the at least two versions comprising a previous version and a new version, wherein access to the previous version includes a previous version uniform resource locator (URL) and access to the new version includes a new version URL; provide the new version URL to a plurality of clients; receive error information of the new version of the application for at least one individual client; and change, for the at least one individual client, the new version URL to the previous version URL, based on the error information.

In an example further to the above example, wherein to manage access to at least two versions of the application, the service directs the processing system to: store at least the previous version URL and the new version URL at the storage system; and store account information for the plurality of clients.

In an example further to any of the above examples, wherein to change the new version URL to the previous version URL, the service directs the computing system to: provide an updated extensible markup language (XML) representation to the at least one individual client, wherein the updated XML representation includes the previous version URL.

In an example further to any of the above examples, the system can further comprise structured data stored at the storage system, the structured data comprising at least account information for the plurality of clients, wherein to change the new version URL to the previous version URL, the service directs the computing system to: change, at the storage system, an entry for an account of the one individual client from the new version URL to the previous version URL.

In an example further to any of the above examples, wherein to change the new version URL to the previous version URL, the service directs the computing system to: change the new version URL to the previous version URL in response to receiving a request to access or run the application specified by the new version URL.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A computer-implemented method comprising:
    managing access to at least two versions of an application, the at least two versions comprising a previous version and a new version, wherein access to the previous version includes a previous version uniform resource locator (URL) and access to the new version includes a new version URL;
    providing the new version URL to a plurality of clients;

receiving error information of the new version of the application for at least one individual client of the plurality of clients; and changing, for the at least one individual client, the new version URL to the previous version URL, based on the error information.

2. The method of claim 1, wherein changing the new version URL to the previous version URL comprises providing an updated extensible markup language (XML) representation to the at least one individual client, wherein the updated XML representation includes the previous version URL.

3. The method of claim 1, wherein changing the new version URL to the previous version URL comprises changing, in a structured data resource, an entry for an account of the one individual client from the new version URL to the previous version URL.

4. The method of claim 1, wherein the changing the new version URL to the previous version URL is performed in response to receiving a request to access or run the application specified by the new version URL.

5. The method of claim 1, further comprising:
receiving a full version of the new version of the application, the full version including logic, graphics, and functionality of the application;
storing the full version of the new version of the application; and
generating the new version URL.

6. The method of claim 1, further comprising:
receiving an extensible markup language (XML) representation of the new version of the application, the XML representation comprising the new version URL.

7. The method of claim 1, wherein the error information comprises one or more of an error signal, error logs, error information from debuggers, changes in usage data, and performance data.

8. The method of claim 1, wherein receiving error information of the new version comprises:
receiving the error information from the at least one individual client; and
analyzing the error information.

9. The method of claim 1, wherein receiving error information of the new version comprises receiving the error information from a telemetry service.

10. One or more computer readable storage media having instructions stored thereon that, when executed by a computing system, direct the computing system to:
provide a new version uniform resource locator (URL) to a client, the new version URL providing access to a new version of an application;
receive error information of the new version of the application for at least one individual client of a plurality of clients accessing the new version of the application via the new version URL; and
change, for the at least one individual client, the new version URL to a previous version URL, based on the error information.

11. The media of claim 10, wherein the instructions that direct the computing system to change the new version URL to the previous version URL direct the computing system to:
provide an updated extensible markup language (XML) representation to the at least one individual client, wherein the updated XML representation includes the previous version URL.

12. The media of claim 10, wherein the instructions that direct the computing system to change the new version URL to the previous version URL direct the computing system to:

change, in a structured data resource, an entry for an account of the one individual client from the new version URL to the previous version URL.

13. The media of claim 10, wherein the instructions that direct the computing system to change the new version URL to the previous version URL direct the computing system to:
change the new version URL to the previous version URL in response to receiving a request to access or run the application specified by the new version URL.

14. The media of claim 10, further comprising instructions stored thereon that, when executed by the computing system, direct the computing system to further:
in response to receiving a full version of the new version of the application, store the full version of the new version of the application and generate the new version URL; and
in response to receiving an extensible markup language (XML) representation of the new version of the application, store the XML representation, wherein the XML representation comprises the new version URL.

15. The media of claim 10, further comprising instructions stored there that, when executed by the computing system, direct the computing system to provide a telemetry service that at least receives the error information from the at least one individual client; and analyzes the error information.

16. A system comprising:
a processing system;
a storage system; and
an automatic application error detection and rollback service stored on the storage system that, when executed by the processing system, directs the processing system to:
manage access to at least two versions of an application, the at least two versions comprising a previous version and a new version, wherein access to the previous version includes a previous version uniform resource locator (URL) and access to the new version includes a new version URL;
provide the new version URL to a plurality of clients;
receive error information of the new version of the application for at least one individual client; and
change, for the at least one individual client, the new version URL to the previous version URL, based on the error information.

17. The system of claim 16, wherein to manage access to at least two versions of the application, the service directs the processing system to:
store at least the previous version URL and the new version URL at the storage system; and
store account information for the plurality of clients.

18. The system of claim 16, wherein to change the new version URL to the previous version URL, the service directs the computing system to:
provide an updated extensible markup language (XML) representation to the at least one individual client, wherein the updated XML representation includes the previous version URL.

19. The system of claim 16, further comprising structured data stored at the storage system, the structured data comprising at least account information for the plurality of clients,
wherein to change the new version URL to the previous version URL, the service directs the computing system to:

change, at the storage system, an entry for an account of the one individual client from the new version URL to the previous version URL.

20. The system of claim 16, wherein to change the new version URL to the previous version URL, the service directs the computing system to:
change the new version URL to the previous version URL in response to receiving a request to access or run the application specified by the new version URL.

* * * * *